(12) United States Patent
Weiss

(10) Patent No.: US 7,391,567 B2
(45) Date of Patent: Jun. 24, 2008

(54) MICROSCOPE, AND METHOD FOR MODIFYING THE LIGHT FLUX IN A MICROSCOPE

(75) Inventor: Albrecht Weiss, Linden (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 16 days.

(21) Appl. No.: 10/705,489

(22) Filed: Nov. 11, 2003

(65) Prior Publication Data
US 2004/0095640 A1    May 20, 2004

(30) Foreign Application Priority Data
Nov. 11, 2002    (DE)    ................. 102 52 664

(51) Int. Cl.
*G02B 21/06* (2006.01)
(52) U.S. Cl. ...................... 359/385; 359/370
(58) Field of Classification Search ............... 359/368, 359/370, 385, 388, 390
See application file for complete search history.

(56) References Cited

U.S. PATENT DOCUMENTS

| | | | | |
|---|---|---|---|---|
| 4,163,150 A * | 7/1979 | Stankewitz | ............... | 250/205 |
| 4,363,532 A | 12/1982 | Weber | ...................... | 350/523 |
| 4,555,620 A | 11/1985 | Bridson et al. | ............ | 250/205 |
| 5,022,744 A | 6/1991 | Leiter | ......................... | 350/530 |
| 6,023,328 A * | 2/2000 | Pierrat | ..................... | 356/237.4 |
| 2003/0011910 A1 | 1/2003 | Weiss | ......................... | 359/891 |

FOREIGN PATENT DOCUMENTS

| | | |
|---|---|---|
| DE | 29 469 27 | 5/1981 |
| DE | 38 14 006 | 11/1989 |
| DE | 10132360 | 11/2002 |

OTHER PUBLICATIONS

Schröder, "Technische Optik", Section 6.8.3, pp. 152-153, Vogel Buchverlag, Würzburg, 1990, ISBN 3-8023-0067-X, XP-002274180.

* cited by examiner

*Primary Examiner*—Joshua L Pritchett
(74) *Attorney, Agent, or Firm*—Darby & Darby

(57) ABSTRACT

A microscope includes a light source, an illuminating optical system, an aperture device, and a spectral correction device. The light source includes a control device for controlling the intensity of light emitted by the light source. The illuminating optical system has a numerical aperture and illuminates a specimen. The aperture device is located in the illumination beam path and modifies the numerical aperture. The spectral correction device is located in the illumination beam path and corrects a change in the spectral intensity distribution of the light emitted by the light source so that the spectral intensity distribution of light directed onto the specimen remains substantially unchanged. Upon a change of the numerical aperture by the aperture device, the light source is controllable by the control device of the light source so that the light flux through the illuminating optical system remains substantially unchanged.

7 Claims, 1 Drawing Sheet

MICROSCOPE, AND METHOD FOR MODIFYING THE LIGHT FLUX IN A MICROSCOPE

This application claims priority to German patent application 102 52 664.8, the subject matter of which is hereby incorporated by reference herein.

The present invention concerns a microscope that comprises: a light source having an associated control device; an illuminating optical system for illuminating a specimen; and an aperture device in an illumination beam path, the numerical aperture of the illuminating optical system being modifiable with the aperture device, and the intensity of the light emitted by the light source being controllable with the control device of the light source. The invention further concerns a method for modifying the light flux in a microscope that comprises: a light source having a control device; an illuminating optical system; and an aperture device in an illumination beam path of the microscope, the numerical aperture of the illuminating optical system being modified with the aperture device, and the intensity of the light emitted by the light source being controlled by the control device of the light source.

BACKGROUND

A modification of the numerical aperture of the illuminating or imaging optical system causes a change in the resolution achievable with the optical imaging system and a change in the contrast of the image generated using the optical imaging system. In microscopes in particular, in order to modify the numerical aperture a diaphragm, or aperture device, whose diameter is variably adjustable is arranged in the illumination beam path. At a maximum aperture diameter, the entire numerical aperture of a condenser and a microscope objective is illuminated, furnishing an image having maximum resolution but low contrast. If, on the other hand, the aperture diameter is decreased or minimized, the optical imaging system then furnishes less resolution but increased contrast.

Upon a change in resolution and contrast by means of the aperture provided in the illumination beam path, however, the light flux through the illumination beam path and into the microscope objective is also modified, so that the brightness of the image additionally changes. A decrease in the diameter of the aperture in the illumination beam path therefore results not only in an image having lower resolution and higher contrast, but also in a darker image.

Two different illumination modes are usually utilized in a microscope, namely transmitted-light and incident-light illumination. The aperture device is usually arranged in the illumination beam path, and with it the numerical aperture of the illumination beam path can then be modified. The illumination beam path extends from the light source to the specimen. In principle, however, the aperture device can also be arranged in the imaging beam path. Some microscopes, for example, have a capability for internal numerical aperture adjustment by way of a built-in iris diaphragm, so that in this case the aperture device is arranged in the imaging beam path. The imaging beam path extends from the specimen to the microscope user's eye, or to the image plane of a camera onto which the specimen is imaged. The discussion hereinafter will be based principally on a microscope which has an aperture device in the illumination beam path.

Also conceivable, in principle, is a microscope configuration in which an aperture device is arranged in the imaging beam path or in the imaging and the illumination beam path, so that the subject matter of the present invention is likewise analogously applicable to these configurations. The aperture device modifies the numerical aperture of the beam path in which it is arranged, and thus the imaging resolution and the contrast in the image.

A modification of the settings regarding the resolution and contrast of the microscope is overlain by a change in the brightness of the microscope image. Especially in quantitative microscopy, in which comparative measurements of different specimens need to be made, this kind of brightness change in the microscope image furnishes distorted results. Ultimately, these correlations very considerably complicate adjustment of these operating parameters of a microscope.

With incandescent or halogen lamps in particular, however, the color temperature or spectral intensity distribution of the light emitted by the respective light source changes if the electrical power delivered to the light source is modified. This is because incandescent lamps exhibit light emission behavior similar to that of a black body, so that when the delivered electrical power is reduced, the color temperature of the spectrum emitted by the incandescent lamp shifts from the blue spectral region toward the red spectral region; this is also referred to generally as a "red shift." This causes a change in the perceived color of the specimen image, although with the microscope according to the present invention there is almost no change in the brightness of the specimen image.

SUMMARY OF THE INVENTION

It is therefore an object of the present invention to provide a microscope that, upon a modification of the numerical aperture of the illuminating optical system, keeps the brightness and perceived color of the specimen image constant.

The present invention provides a microscope that includes: a light source having an associated control device; an illuminating optical system for illuminating a specimen; and an aperture device in an illumination beam path, the numerical aperture of the illuminating optical system being modifiable with the aperture device, and the intensity of the light emitted by the light source being controllable with the control device of the light source. According to the invention:

upon a modification of the numerical aperture by means of the aperture device, the light source is simultaneously controllable by the control device of the light source in such a way that the light flux through the illuminating optical system remains substantially unmodified; and that there is arranged in the illumination or imaging beam path a spectral correction means with which a modification of the spectral intensity distribution of the light emitted by the light source, brought about because of the controlling of the light source by the control device, is correctable in such a way that the spectral intensity distribution of the light directed onto the specimen remains at least largely unmodified.

A further object of the invention is to provide a method for modifying the light flux in a microscope with which, upon a change in the numerical aperture of the illuminating optical system, the brightness and perceived color of the specimen image are kept constant. The invention also provides a method for modifying the light flux in a microscope that includes: a light source having a control device; an illuminating optical system; and an aperture device in an illumination beam path of the microscope. According to the invention:

upon a modification of the numerical aperture by means of the aperture device, the light source is simultaneously controlled by the control device of the light source in such a way that the light flux passing through the illuminating optical system remains substantially unmodified; and that a modification of the spectral intensity distribution of the light emitted by the light source, brought about because of the controlling of the light source by the control device of the light source, is corrected in such a way that the spectral intensity distribution of the light directed onto the specimen remains at least largely unmodified.

The resolution and contrast of an optical image can be modified, without influencing the brightness of the specimen image, if the light source is simultaneously controlled or regulated. In this context, the light source is to be controlled in such a way that upon a modification of the numerical aperture, the light flux passing through the illuminating optical system remains substantially unmodified, if the aperture device is arranged in the illuminating optical system. The same correspondingly applies in the situation in which the aperture device is arranged in the imaging beam path.

In order to maintain the perceived color of the specimen image, according to the present invention a spectral correction means is provided. With this, a modification of the spectral intensity distribution of the light emitted by the light source, brought about because of the controlling of the light source by the control device of the light source, is correctable in such a way that the spectral intensity distribution of the light directed onto the specimen remains at least largely unmodified. This thus ensures that a modification of the numerical aperture of the illuminating or imaging optical system brings about neither a change in brightness nor an undesired change in the color of the specimen image.

A modification of the numerical aperture of the illumination beam path could be implemented, for example, using an aperture whose aperture diameter is modifiable (iris diaphragm). If, for example, the diameter of the aperture is changed from a value D to a value d, that causes a modification of the brightness of the resulting image by a factor of $(d/D)^2$.

This factor by which the intensity of the light of the light source must ultimately be increased or decreased, depending on whether the aperture diameter is made larger or smaller. It is thereby possible, in advantageous fashion, to ensure that consistent brightness conditions are present in the optical image. In the aforementioned example, the specimen is being illuminated with transmitted light, and the modification of the intensity of the light of the light source by a factor of $(d/D)^2$ results in an unmodified light flux passing through the illuminating optical system.

For example, the specimen could be observed using a microscope objective having an integrated iris diaphragm. The modification of the numerical aperture could then be effected by way of an adjustment of the integrated iris diaphragm. In order to achieve a brightness-neutral image in this case, there could be provided in the microscope objective a corresponding decoder that reads out the numerical aperture value currently set on the microscope objective and, on the basis thereof, correspondingly controls or regulates the light source.

Depending on the accuracy with which the brightness of the specimen image needs to be controlled in open- or closed-loop fashion, it may be necessary to provide a light-sensitive detector arranged in the imaging or illumination beam path. This detector is arranged in such a way that it detects at least a portion of the light flux passing through the illuminating optical system and generates, as a function thereof, a signal that is usable for open- or closed-loop control of the light source. This detector could be, for example, a photodiode; a portion of the light can be coupled out, for example, by insertion of a glass plate into the respective beam path (e.g. at a 45-degree angle to the optical axis) and directed onto the photodiode. With this action, objective control of the brightness of the image can be accomplished with no reliance on a microscope user's subjective impression.

Concretely, the aperture device could encompass an aperture whose diameter is modifiable, for example an iris diaphragm. These are, in this respect, standard components that are used in optics, so that the material costs therefore can be minimized. Preferably the modification of the aperture diameter is effected by a motor. With appropriate motor control and calibration, this allows conclusions as to the aperture diameter that is presently set. Stepping motors are preferably used as the motor.

In some cases the light source is powered electrically. The control device of the light source controls the light source by way of a modification of the delivered electrical power, as a result of which the power level of the light emitted by the light source changes. Incandescent lamps or halogen lamps are used, for example, as the light source, in which context the control device elevates or lowers the electrical current flowing through the light source.

The spectral correction means could, in principle, be arranged in the illumination beam path or in the imaging beam path. An arrangement of the spectral correction means in the illumination beam path is usually preferred, since the spectral correction means could be constituted, for example, by a filter having a structured coating, which could result in imaging artifacts if it were arranged in the imaging beam path.

The spectral correction means could encompass an optical filter that is embodied in accordance with German Patent Application DE 101 32 360.3-42, the subject matter of which is hereby incorporated by reference herein.

In a concrete embodiment, the spectral correction means encompasses a filter that is embodied as an absorption filter. It has several working positions with different thicknesses that are can be introduced into the illumination beam path, the spectral transmittance of the filter changing as a function of thickness. A filter of this kind can be embodied as a wedge-shaped plate or disk; the minimum and maximum thickness of the filter are be selected in such a way that the spectral transmittance of the filter causes a minimal and a maximal modification of the spectral intensity distribution of the light emitted by the light source.

As an alternative to this, the spectral correction means could encompass an interference filter or a reflection filter that exhibits a differing spectral interference or reflection capability over its filter surfaces corresponding to working positions that can be arranged in the illumination beam path. For example, the interference filter could be embodied in the form of a transparent glass plate that has an interference filter layer whose spectral transmittance increases over its surface from a minimal to a maximal value. As a function of the positioning of this filter relative to the illumination beam path, a corresponding spectral transmittance of the filter can be established.

In both cases, the spectral transmittance of the filter could change continuously or discontinuously, i.e., in particular in stepped fashion. In particular, an absorption filter embodied in the form of a wedge-shaped plate exhibits a spectral transmittance that changes continuously. A reflection or interference filter, on the other hand, could have different regions in each of which a constant value of the spectral transmittance is present.

A modification of the spectral intensity distribution of the light emitted by the light source could be achieved by way of a motion of the spectral correction means relative to the illumination beam path, in particular in the case of the aforementioned filters. A relative motion of this kind is preferably brought about by way of a motor that conveys the filter into its respective working positions. Here as well, stepping motors are preferably used.

The relative motion of the spectral correction means that is provided is, in particular, a displacement of a linearly embodied filter, or a rotation of a filter embodied in the form of a circular disk. A corresponding guidance system for the filter, for example in the form of a pin serving as rotation shaft, is mounted in stationary fashion on the microscope.

In the context of automation of the operation of the microscope, in a preferred embodiment the working positions of the spectral correction means that are provided are stored in a data storage unit. This data storage unit could be embodied, for example, in the form of a RAM module that is located on an electronic control board associated with the microscope. The stored working positions of the spectral correction means can, of course, also be read out of the data storage unit, so that a value corresponding to a provided working position can be read out of the data storage unit in order to execute the relative motion of the spectral correction means.

The spectral correction means could be embodied in such a way that with it, the light intensity of the green and especially of the red spectral region of the light emitted by the light source can be influenced. If the electrical power delivered to the light source is reduced and the spectral intensity profile of the light emitted by the light source thus shifts toward the red, the spectral correction means would thus need to be brought into its working position with its region that more strongly absorbs the corresponding spectral region of the light emitted by the light source. It is sufficient in principle to influence the green and, in particular, the red spectral region of the light of the light source. In order to achieve a color-neutral brightness change, the blue spectral region remains largely unchanged.

Concretely, the spectral correction means encompasses a control device that preferably is controlled simultaneously with the control device of the light source and/or the aperture device. The control device of the spectral correction means controls, for example, the motor that brings the spectral correction means into its working position. As a result of the simultaneous controlling of the spectral correction means and the control device of the light source, upon a modification of the intensity of the light emitted by the light source, a change in the perceived color in an image associated therewith is advantageously compensated for. If, for example, the intensity of the light emitted by the light source is elevated (or reduced), the spectral blue shift (or red shift) of the light associated therewith is simultaneously compensated for by the spectral correction means.

A simultaneous controlling of the aperture device is further provided for according to the present invention, so that upon a modification of the aperture, the other two parameters—i.e. the light intensity of the lamp and the position of the spectral correction means—are correspondingly controlled or regulated.

For concrete implementation of the simultaneous modification of these parameters, the aperture device, the control device of the light source, and/or the control device of the spectral correction means could be controlled or regulated by a control computer. A conventional personal computer or notebook computer could serve, for example, as the control computer; in the case of a microscope, the control computer could also be implemented on a circuit board that is housed in the microscope stand or in a control device associated with the microscope.

BRIEF DESCRIPTION OF THE DRAWINGS

There are various ways of advantageously embodying and developing the teaching of the present invention. The reader is referred, for that purpose, on the one hand to the claims subordinate to the independent claims, and on the other hand to the explanation below of an embodiment of the invention with reference to the drawing. In the drawing:

DETAILED DESCRIPTION

Figure 1:
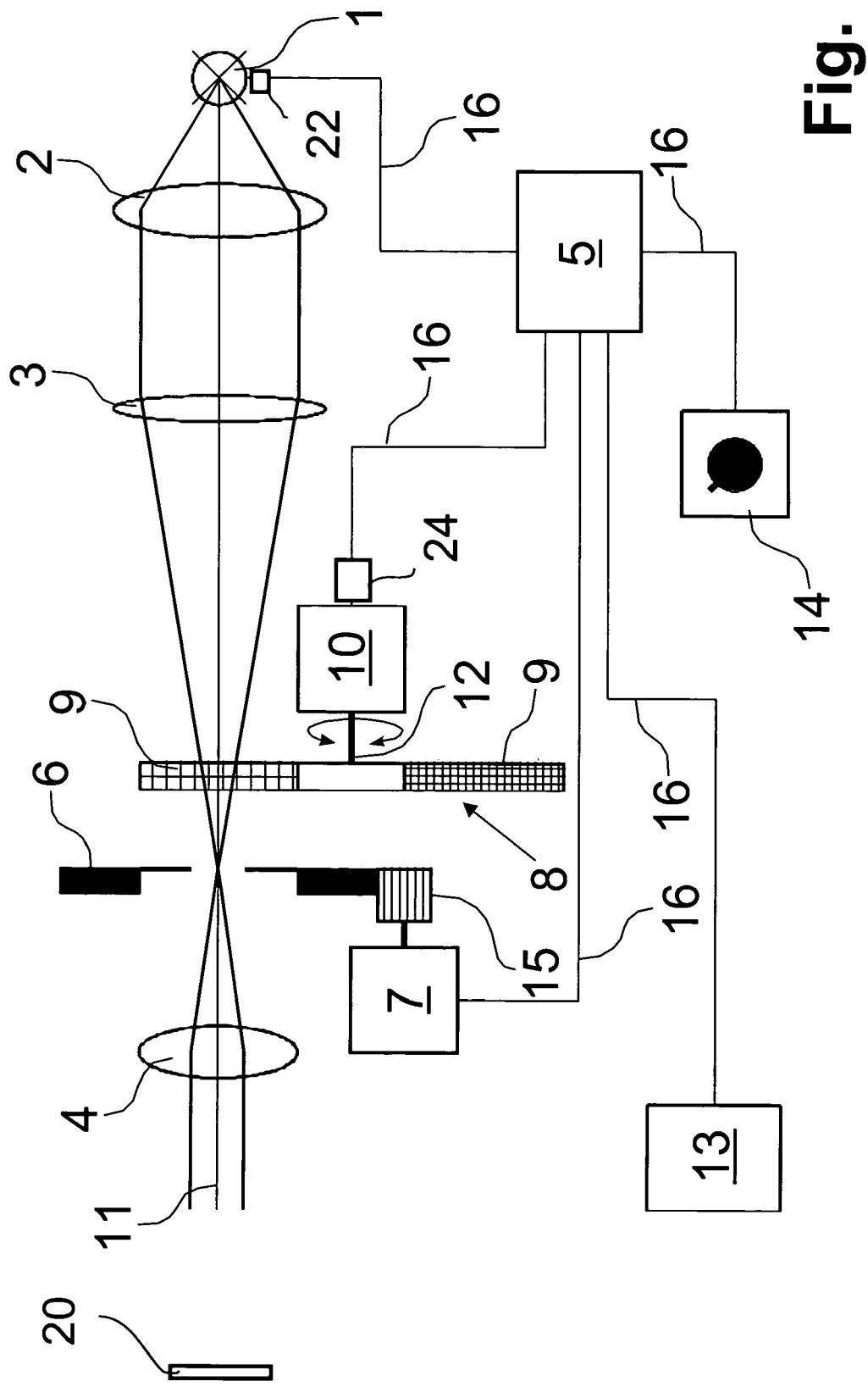
FIG. 1 shows a schematic depiction of a microscope according to an embodiment of the present invention.

FIG. 1 shows a portion of a microscope, specifically a portion of an illumination beam path. A specimen 20, which is located on the leftward extension of optical axis 11 of the illumination beam path, is illuminated with the light of light source 1. An illuminating optical system, which directs the light of light source 1 toward specimen 20 and of which lenses 2, 3, 4 are shown, is provided for this purpose.

A control device 22 of light source 1, associated with a control computer 5, controls the intensity of the light emitted by light source 1. An aperture device 6 is arranged in the illumination beam path of the microscope, the numerical aperture (and thus the resolution and contrast) of the image being modified with aperture device 6.

Aperture device 6 encompasses an aperture whose diameter is modifiable by way of a motor 7 associated with aperture device 7, and a drive pinion 15.

Upon a modification of the numerical aperture of the illuminating optical system by means of aperture device 6, light source 1 is simultaneously controlled by the control device of light source 1 in such a way that the light flux passing through the illuminating optical system remains substantially unmodified.

According to the present invention a spectral correction means 8 is additionally provided, with which a change in the spectral intensity distribution of the light emitted by light source 1, brought about by the controlling of light source 1 by the control device of light source 1, is corrected in such a way that the spectral intensity distribution of the light directed onto specimen 20 remains at least largely unmodified.

Spectral correction means 8 is arranged in the illumination beam path and encompasses a filter 9 that is embodied as a circular-disk-shaped interference filter and that has, over its filter surfaces corresponding to working positions that can be introduced into the illumination beam path, a differing spectral interference capability and, associated therewith, a differing spectral transmittance. The differently configured filter surfaces are indicated with different shadings.

A modification of the spectral intensity distribution of the light emitted by light source 1 is achieved by way of a motion of filter 9 of spectral correction means 8 relative to the illumination beam path. This relative motion is a rotation that is brought about by motor 10. Circular-disk-shaped filter 9 is mounted on motor shaft 12. The working positions of filter 9 of spectral correction means 8 that are provided are stored in a data storage unit of control computer 5.

Spectral correction means 8 encompasses a control device 24, associated with control computer 5, that is controlled simultaneously with control device 22 of light source 1 and with aperture device 6.

Aperture device 6, control device 22 of light source 1, and control device 24 of spectral correction means 8 can be controlled or regulated by control computer 5. Control computer 5 is controllable by a personal computer 13. In addition, the diameter of the aperture of aperture device 6 can be set directly using rotary switch 14. This setting is implemented via control computer 5 and motor 7 of aperture device 6. Control computer 5 simultaneously calculates the electrical power to be delivered to light source 1 so that the specimen is illuminated with substantially the same light power level, and delivers the corresponding electrical power to light source 1. Also simultaneously, control computer 5 calculates the position of filter 9 of spectral correction means 8 in such a way that in the context of a modified light power level, there is almost no change in spectral intensity of the light directed onto the specimen. Connecting lines 16 extend respectively between control computer 5 on the one hand and light source 1, motor 7 of aperture device 6, motor 10 of spectral correction means 8, personal computer 13, and rotary switch 14 on the other hand.

What is claimed is:

1. A method for modifying a light flux in a microscope including an electrically powered light source having a control device, an illuminating optical system for illuminating a specimen, an aperture device disposed in an illumination beam path of the microscope and a spectral correction device disposed in the illumination beam path, the method comprising:

changing a numerical aperture of the illuminating optical system using the aperture device so as to change a resolution and contrast of the microscope; and concurrently controlling the control device and the spectral correction device so that, upon a change in the numerical aperture, both a light flux through the illuminating optical system and a spectral intensity distribution of light directed onto the specimen remains substantially unchanged.

2. The method as recited in claim 1 further comprising:
detecting at least a portion of the light flux passing through the illuminating optical system; and
generating a signal based on the detecting, the signal being usable for at least one of open-loop or closed-loop control of the light source and for correcting a spectral intensity distribution of light emitted by the light source.

3. The method as recited in claim 1 wherein the controlling is performed by moving the spectral correction device relative to the illumination beam path.

4. The method as recited in claim 3 wherein the moving of the spectral correction device is performed by at least one of displacing a first filter and rotating a second filter, the second filter including a circular disk.

5. The method as recited in claim 1 wherein the controlling includes moving the spectral correction device relative to the illumination beam path and further comprising:
providing, as a function of respective settings of the aperture device, respective values of the intensity of the light emitting by the light source and respective working positions of the spectral correction device, and
storing the provided values and working positions in a data storage unit.

6. The method as in claim 1 further comprising controlling the aperture device using a control computer, and wherein the controlling the control device and the spectral correction device is performed using the control computer.

7. The method as recited in claim 1 wherein the controlling includes moving the spectral correction device relative to the illumination beam path so as to change the spectral intensity distribution of the light from the light source.

* * * * *